United States Patent
Walter

(10) Patent No.: US 6,824,327 B1
(45) Date of Patent: Nov. 30, 2004

(54) ARTIFICAL BARRIER REEF

(76) Inventor: David M. Walter, P.O. Box 998, Orange Beach, AL (US) 36561

( * ) Notice: Subject to any disclaimer, the term of this patent is extended or adjusted under 35 U.S.C. 154(b) by 0 days.

(21) Appl. No.: 10/446,208

(22) Filed: May 27, 2003

(51) Int. Cl.[7] ............................................. A01K 61/00
(52) U.S. Cl. ........................... 405/33; 405/25; 119/221
(58) Field of Search ................................ 119/200, 215, 119/221; 405/21, 24, 25, 29, 30, 33

(56) References Cited

U.S. PATENT DOCUMENTS

| | | | | |
|---|---|---|---|---|
| 1,140,140 A | * | 5/1915 | Everett et al. ................. | 405/35 |
| 3,844,125 A | * | 10/1974 | Williams, Sr. ................ | 405/33 |
| 4,388,019 A | * | 6/1983 | Kajihara ....................... | 405/25 |
| 4,465,399 A | * | 8/1984 | Kikuzawa et al. ............ | 405/32 |
| 4,710,057 A | * | 12/1987 | Laier ............................ | 405/30 |
| 5,080,526 A | * | 1/1992 | Waters ......................... | 405/29 |
| 5,201,136 A | * | 4/1993 | LaMorte et al. .................. | 43/4 |
| 5,269,254 A | * | 12/1993 | Gagliano et al. ........... | 119/237 |
| 5,427,472 A | * | 6/1995 | Ono ............................. | 405/29 |
| 6,042,300 A | | 3/2000 | Walter ......................... | 405/29 |
| 6,186,702 B1 | | 2/2001 | Bartkowski .................. | 405/25 |

* cited by examiner

Primary Examiner—Robert E. Pezzuto
Assistant Examiner—Tara L. Mayo
(74) Attorney, Agent, or Firm—Michael I. Kroll

(57) ABSTRACT

An artificial barrier reef has a skeletal frame formed from a plurality of support beams. The frame has a base and a plurality of side panels extending from the base to form a pyramid. A plurality of connectors are used to connect the support beams together. A cap connects the support beams and forms the side panels at an apex of said frame. Also, a plurality of grates, each grate connected to cover a respective one of said side panels and including a plurality of bars connected in a criss-cross pattern allow for fish of a predetermined size to pass therethrough into and out of the skeletal frame. The artificial barrier reef is positioned on the floor of a body of water for aiding in the development of an underwater ecosystem pass therethrough into and out of said skeletal frame.

14 Claims, 7 Drawing Sheets

ARTIFICAL BARRIER REEF

BACKGROUND OF THE INVENTION

1. Field of the Invention

The present invention relates generally to environmental structures and, more specifically, to an artificial reef having a tetrahedral structure with concrete beams extending from and connected to one another to form a skeletal frame. Side grid panels are placed against the skeletal frame and are connected to each other via connection hooks to form a pyramid structure that may be used to provide a habitat and protection for aquatic life.

2. Description of the Prior Art

Numerous other environmental structures designed for the production of an artificial barrier reef. Typical of these is U.S. Pat. No. 6,042,300 issued to Walter on Mar. 28, 2000. Another such patent was issued to Bartkowski on Feb. 13, 2001 as U.S. Pat. No. 6,186,702. While these artificial barrier reefs may be suitable for the purposes for which they were designed, they would not be as suitable for the purposes of the present invention, as hereinafter described.

U.S. Pat. No. 6,042,300

Inventor: David M. Walter

Issued: Mar. 28, 2000

An equilateral tetrahedral frame, comprising six concrete beams inserted through the center of a number of automotive tires. The ends of the concrete beams are fastened together at four points. These four points are covered by a cap of concrete to seal the fastening points. The reef device may be of any size. The design permits ease of transport due to its ability to stack one upon another uniqueness of this reef is in the design. Once the reef is transported to its desired location, it can be lowered or dropped to the sea floor.

U.S. Pat. No. 6,186,702

Inventor: Michael Scott Bartkowski

Issued: Feb. 13, 2001

An artificial reef that will adequately promote marine growth, marine life, and prevention erosion by providing a unique design and configuration. The artificial reef is a vertical structure having an enclosed top wall, an opened bottom, and at least three side walls for forming an overall geometrical shape. An opening extends through the enclosed top wall and at least one opening extends through each side wall. This design and configuration will provide an optimum means for water flow and provide adequate and efficient stability of the final structure. This will ultimately prevent damage, rollovers, or the like, even during turbulent weather conditions.

SUMMARY OF THE PRESENT INVENTION

The present invention relates generally to environmental structures and, more specifically, to an artificial reef having a tetrahedral structure with concrete beams extending from and connected to one another to form a skeletal frame. Side grid panels are placed against the skeletal frame and are connected to each other via connection hooks to form a pyramid structure that may be used to provide a habitat and protection for aquatic life.

A primary object of the present invention is to provide an artificial barrier reef that will overcome the shortcomings of prior art devices.

Another, secondary object of the present invention is to provide an artificial barrier reef having a tetrahedral shaped skeletal framework formed from a plurality of concrete support beams.

A further object of the present invention is to provide an artificial barrier reef having a plurality of side panels.

A yet further object of the present invention is to provide an artificial barrier reef wherein the side panels form a grid for allowing for the ingress of small aquatic wildlife while providing a barrier to larger aquatic wildlife.

Yet another object of the present invention is to provide an artificial barrier reef having a lifting element for selective placement and replacement at desired locations.

Still another object of the present invention is to provide an artificial barrier reef that allows for the attachment thereon of plant life or crustaceans.

Another object of the present invention is to provide an artificial barrier reef having a plurality of hooks that selectively connect the side panels to one another to maintain placement on the tetrahedron frame.

Yet another object of the present invention is to provide an artificial barrier reef that is stackable one on top of another for easy transportation and storage thereof.

Still yet another object of the present invention is to provide an artificial barrier reef having weighted concrete blocks positioned at each of the junctions of the concrete beams forming the skeletal frame.

An even further object of the present invention is to provide an artificial barrier reef having additional weight and stability to aid the present invention in remaining stationary and resisting drift or erosion.

Another object of the present invention is to provide an artificial barrier reef that is simple and easy to use.

A still further object of the present invention is to provide an artificial barrier reef that is economical in cost to manufacture.

Additional objects of the present invention will appear as the description proceeds.

The present invention overcomes the shortcomings of the prior art by providing an artificial barrier reef formed from a plurality of concrete beams formed in a tetrahedral shape thereby forming a skeletal framework. At each junction of the concrete beams, a weighed block, preferably formed from concrete, is used to connect each beam to the other. A lifting element positioned at the apex of the skeletal framework in order to allow easy transportation and positioning of the artificial barrier reef in its desired position. A plurality of side panels, each formed as a grid, is positioned on each side of the skeletal framework thereby allow for the ingress of small aquatic life while functioning as a barrier for larger species and also provides an anchoring base for many stationary life forms such as crustaceans, coral, mollusks and plant life.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

The foregoing and other objects and advantages will appear from the description to follow. In the description reference is made to the accompanying drawing, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawing, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views.

DESCRIPTION OF THE REFERENCED NUMERALS

Figure 1:
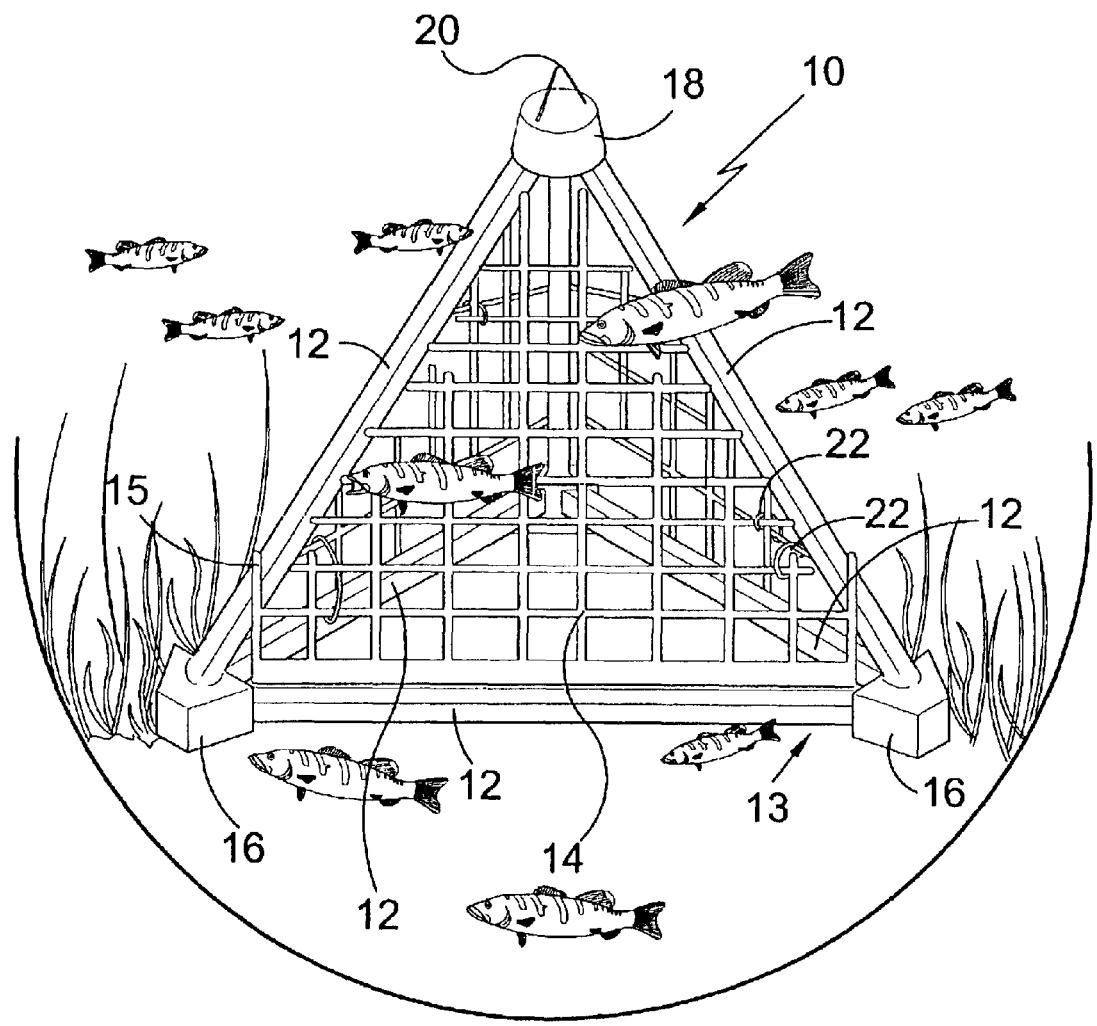
FIG. 1 is a perspective view of the artificial barrier reef of the present invention positioned on the floor of a body of water.

Turning now descriptively to the drawings, in which similar reference characters denote similar elements throughout the several views, the Figures illustrate the artificial barrier reef of the present invention. With regard to the reference numerals used, the following numbering is used throughout the various drawing figures.

10 artificial barrier reef of the present invention
12 support beam
13 skeletal frame
14 side panel
16 weighted connector
18 cap
20 loop
22 connecting hooks

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments. Practitioners skilled in the art will recognize numerous other embodiments as well. For definition of the complete scope of the invention, the reader is directed to appended claims.

Turning now descriptively to the drawings, in which similar reference characters denote similar elements throughout the several views, FIGS. 1 through 7 illustrate the artificial barrier reef of the present invention generally by the numeral 10.

FIG. 1 is an illustrative view of an artificial barrier reef 10 of the present invention positioned on the floor of a body of water. The artificial barrier reef 10 includes a plurality of support beams 12 connected to one another so as to form a skeletal frame 13. The skeletal frame 13 preferably is in the shape of an equilateral tetrahedron. Preferably, the support beams 12 are formed from concrete in order to provide rigid support for the skeletal frame 13 while not adversely interfering with the aquatic environment in which the artificial barrier reef 10 is placed. The use of concrete is described only for purposes of example and any material which provides rigid support and would not adversely interfere with an aquatic environment could be used.

The skeletal frame 13 is formed from six support beams 12. The skeletal frame 13 is formed by three support beams 12 arranged in the shape of a triangle. The three support beams 12 which form the base are connected at each vertex by a weighted connector 16. Preferably, the weighted connectors 16 are each also formed from concrete, however any material that would provide additional weight and aid in preventing unwanted drift of the artificial barrier reef 10 may be used. The remaining three support beams 12 not used to form the triangular base are connected to extend angularly from the weighted connectors 16 at each vertex of the triangular base to form a pyramid. The angularly extending support beams 12 are secured together by a cap 18 at an apex of the pyramid where the angularly extending support beams 12 meet. The cap 18 connecting the support beams 12 is preferably weighted and formed from concrete as well in order to prevent unwanted drift of the artificial barrier reef 10 after placement in a body of water. Positioned on the cap 18 is a loop 20 for use in selectively moving and positioning of the artificial barrier reef 10 of the present invention. Preferably, a mechanical lifting device such as a crane is connected to the loop 20 of the artificial barrier reef 10 to aide in lifting and positioning of the artificial barrier reef 10 both on land and in the water. However, any device able to lift and move the artificial barrier reef 10 of the present invention may be used to selectively position the artificial barrier reef 10 both on land and in water.

The artificial barrier reef 10 of the present invention further includes a plurality of side panels 14 for positioning against the sides of the pyramid of the skeletal frame 13. Preferably, three side panels 14 used to form the artificial barrier reef 10 of the present invention. However, a fourth side panel 14 may also be used by positioning the fourth side panel 14 on the remaining open end of the equilateral tetrahedron. It is preferable that the side panels 14 are formed from metal which would provide support to the artificial barrier reef 10 without adversely affecting the aquatic environment surrounding the reef 10 and which would allow plant life and crustaceans to attach thereby forming an ecosystem where the artificial barrier reef 10 is positioned on the floor of the body of water. The side panels 14 are also formed as a grid. The space between the gridlines is at a predetermined distance preferably between the range of 0.5 and 25 inches. Preferably, the distance between the gridlines is 1.5 inches. The grid of the side panels 14 are formed so as to allow small aquatic life to pass easily therethrough, as well as to allow plant life, crustaceans, and other stationary forms of life to attach thereto. The side panels 14 are triangular in shape and are positioned within and against the skeletal frame 13. Extending up from a base of the triangular side panels 14 at each end thereof is a brake 15. Upon placing the side panels 14 within the skeletal frame 13, the break 15 rests against the support beam 12. The break 15 holds the side panel 14 in place and ensures a secure fit within the skeletal frame 13. Upon placement of the side panels 14, connection hooks 22 are used to connect each side panel 14 to another side panel 14. At least one connection hook 22 must be used to connect the side panels 14 to each other. However, it is preferable to have a plurality of connection hooks 22 used to connect each side panel 14 so as to ensure that the side panels 14 remain in place on the artificial barrier reef 10 of the present invention. The connection hooks 22 have a first end and a second end. Both the first end and the second end each form a hook. The hook of the first end connects to a respective gridline of one side panel 14. The hook of the second end connects to the corresponding gridline on an adjacent side panel 14. Upon connection of a plurality of connection hooks 22, the side panels 14 are secured within the skeletal frame.

Figure 2:
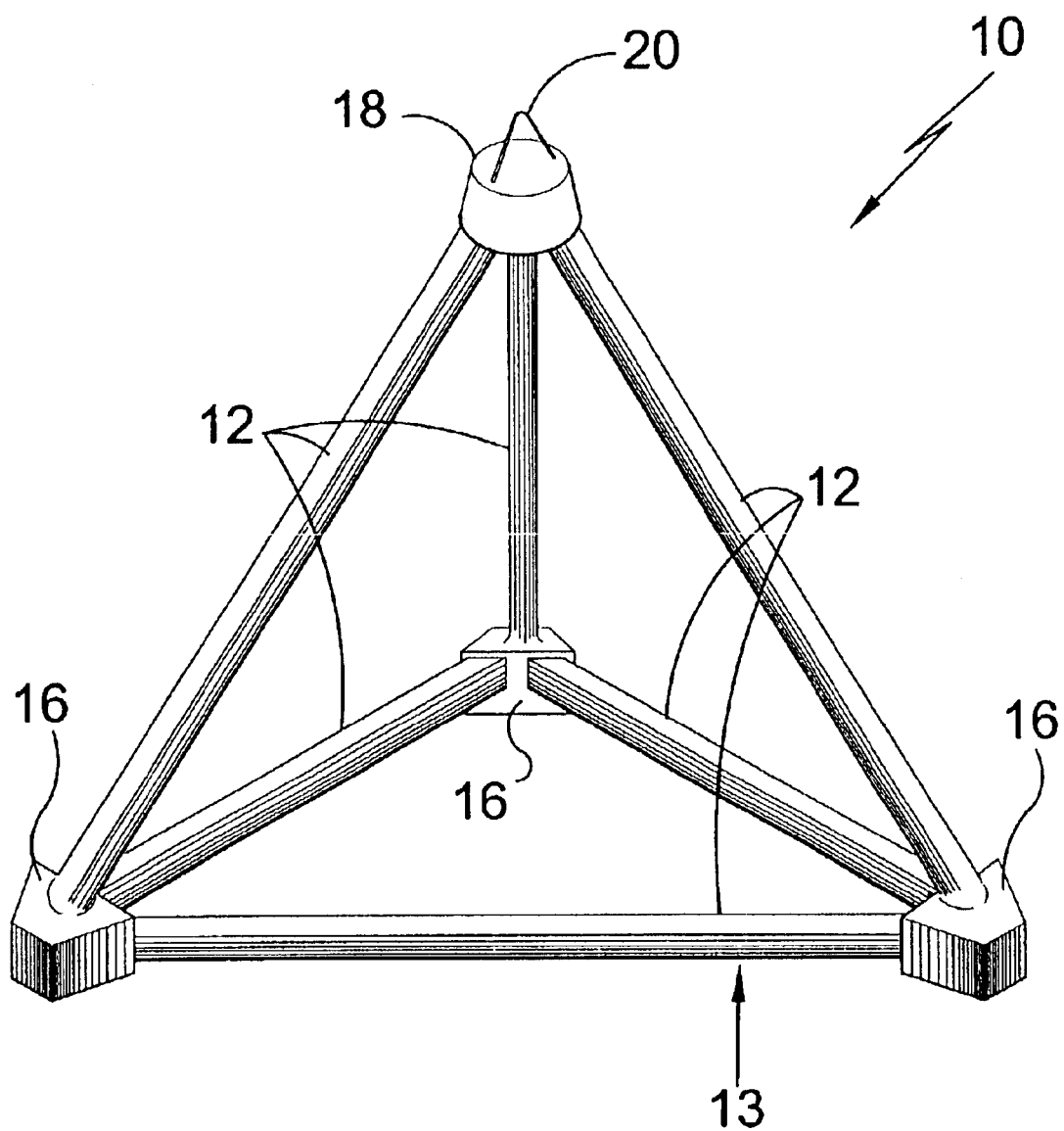
FIG. 2 is a perspective view of the skeletal framework of the artificial barrier reef of the present invention.

FIG. 2 is a perspective view of the skeletal framework of the artificial barrier reef of the present invention. The artificial barrier reef 10 includes a plurality of support beams 12 connected to one another so as to form a skeletal frame 13. The skeletal frame 13 preferably is in the shape of an equilateral tetrahedron. Preferably, the support beams 12 are formed from concrete in order to provide rigid support for the skeletal frame 13 while not adversely interfering with the aquatic environment in which the artificial barrier reef 10 is placed. The use of concrete is described only for purposes of example and any material which provides rigid support and would not adversely interfere with an aquatic environment could be used.

The skeletal frame 13 is formed from six support beams 12. The skeletal frame 13 is formed by three support beams 12 arranged in the shape of a triangle. The three support beams 12 which form the base are connected at each vertex by a weighted connector 16. Preferably, the weighted connectors 16 are each also formed from concrete, however any material that would provide additional weight and aid in preventing unwanted drift of the artificial barrier reef 10 may be used. The remaining three support beams 12 not used to form the triangular base are connected to extend angularly from the weighted connectors 16 at each vertex of the triangular base to form a pyramid. The angularly extending support beams 12 are secured together by a cap 18 at an apex of the pyramid where the angularly extending support beams 12 meet. The cap 18 connecting the support beams 12 is preferably weighted and formed from concrete as well in order to prevent unwanted drift of the artificial barrier reef 10 after placement in a body of water. Positioned on the cap 18 is a loop 20 for use in selectively moving and positioning of the artificial barrier reef 10 of the present invention. Preferably, a mechanical lifting device such as a crane is connected to the loop 20 of the artificial barrier reef 10 to aide in lifting and positioning of the artificial barrier reef 10 both on land and in the water. However, any device able to lift and move the artificial barrier reef 10 of the present invention may be used to selectively position the artificial barrier reef 10 both on land and in water.

Figure 3:
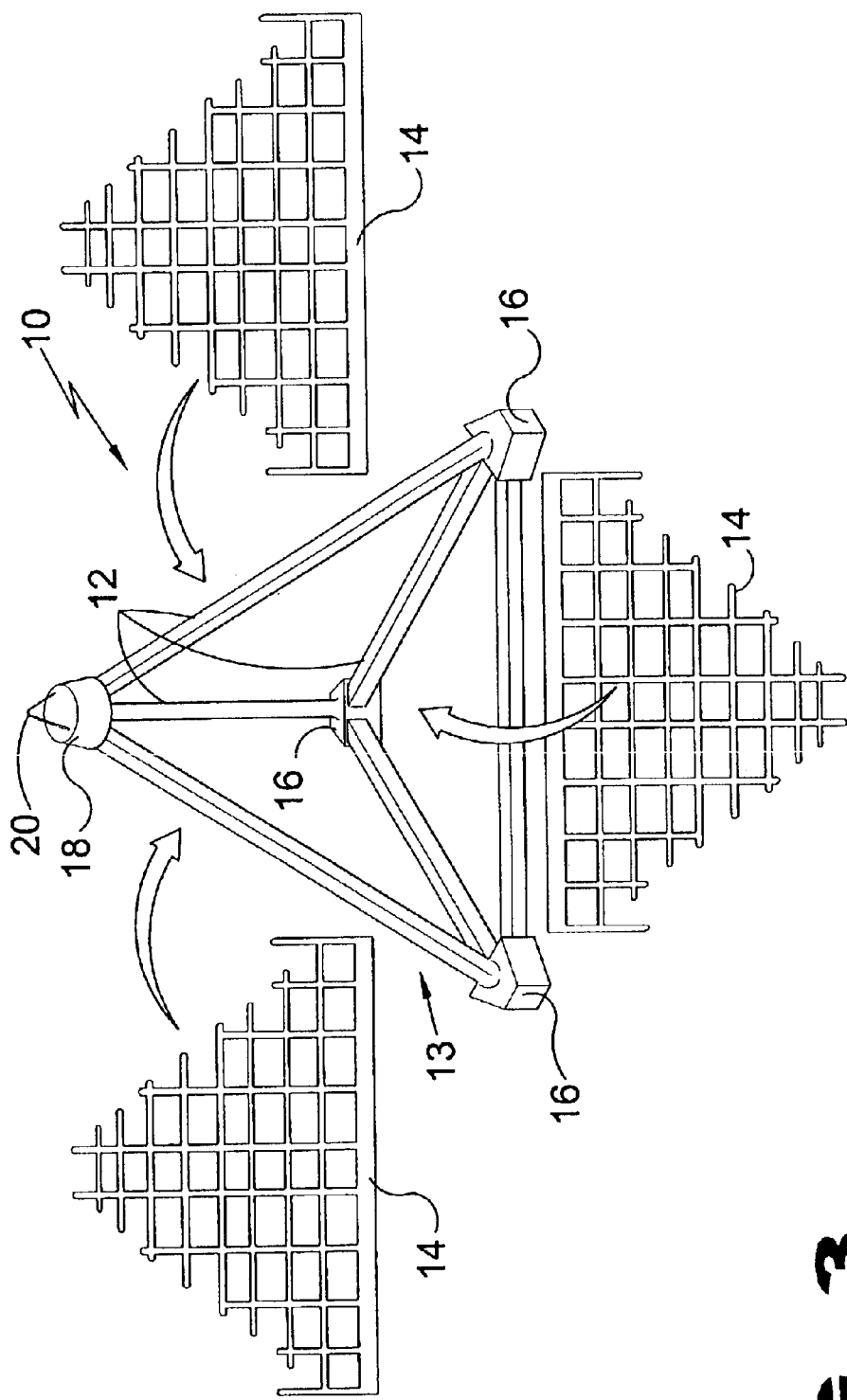
FIG. 3 is a perspective view of the skeletal framework of the artificial barrier reef of the present invention with the side panels not connected.

FIG. 3 is a perspective view of the skeletal framework of the artificial barrier reef of the present invention with the side panels not connected. The artificial barrier reef 10 includes a plurality of support beams 12 connected to one another so as to form a skeletal frame 13. The skeletal frame 13 preferably is in the shape of an equilateral tetrahedron. Preferably, the support beams 12 are formed from concrete in order to provide rigid support for the skeletal frame 13 while not adversely interfering with the aquatic environment in which the artificial barrier reef 10 is placed. The use of concrete is described only for purposes of example and any material which provides rigid support and would not adversely interfere with an aquatic environment could be used.

The skeletal frame 13 is formed from six support beams 12. The skeletal frame 13 is formed by three support beams 12 arranged in the shape of a triangle. The three support beams 12 which form the base are connected at each vertex by a weighted connector 16. Preferably, the weighted connectors 16 are each also formed from concrete, however any material that would provide additional weight and aid in preventing unwanted drift of the artificial barrier reef 10 may be used. The remaining three support beams 12 not used to form the triangular base are connected to extend angularly from the weighted connectors 16 at each vertex of the triangular base to form a pyramid. The angularly extending support beams 12 are secured together by a cap 18 at an apex of the pyramid where the angularly extending support beams 12 meet. The cap 18 connecting the support beams 12 is preferably weighted and formed from concrete as well in order to prevent unwanted drift of the artificial barrier reef 10 after placement in a body of water. Positioned on the cap 18 is a loop 20 for use in selectively moving and positioning of the artificial barrier reef 10 of the present invention. Preferably, a mechanical lifting device such as a crane is connected to the loop 20 of the artificial barrier reef 10 to aide in lifting and positioning of the artificial barrier reef 10 both on land and in the water. However, any device able to lift and move the artificial barrier reef 10 of the present invention may be used to selectively position the artificial barrier reef 10 both on land and in water.

The artificial barrier reef 10 of the present invention further includes a plurality of side panels 14 for positioning against the sides of the pyramid of the skeletal frame 13. Preferably, three side panels 14 used to form the artificial barrier reef 10 of the present invention. However; a fourth side panel 14 may also be used by positioning the fourth side panel 14 on the remaining open end of the equilateral tetrahedron. It is preferable that the side panels 14 are formed from metal which would provide support to the artificial barrier reef 10 without adversely affecting the aquatic environment surrounding the reef 10 and which would allow plant life and crustaceans to attach thereby forming an ecosystem where the artificial barrier reef 10 is positioned on the floor of the body of water. The side panels 14 are also formed as a grid. The space between the gridlines is at a predetermined distance preferably between the range of 0.5 and 25 inches. Preferably, the distance between the gridlines is 1.5 inches. The grid of the side panels 14 are formed so as to allow small aquatic life to pass easily therethrough, as well as to allow plant life, crustaceans, and other stationary forms of life to attach thereto. The side panels 14 are triangular in shape and are positioned within and against the skeletal frame 13. Extending up from a base of the triangular side panels 14 at each end thereof is a brake 15. Upon placing the side panels 14 within the skeletal frame 13, the break 15 rests against the support beam 12. The break 15 holds the side panel 14 in place and ensures a secure fit within the skeletal frame 13. Upon placement of the side panels 14, connection hooks 22 are used to connect each side panel 14 to another side panel 14. At least one connection hook 22 must be used to connect the side panels 14 to each other. However, it is preferable to have a plurality of connection hooks 22 used to connect each side panel 14 so as to ensure that the side panels 14 remain in place on the artificial barrier reef 10 of the present invention. The connection hooks 22 have a first end and a second end. Both the first end and the second end each form a hook. The hook of the first end connects to a respective gridline of one side panel 14. The hook of the second end connects to the corresponding gridline on an adjacent side panel 14. Upon connection of a plurality of connection hooks 22, the side panels 14 are secured within the skeletal fame 13.

Figure 4:
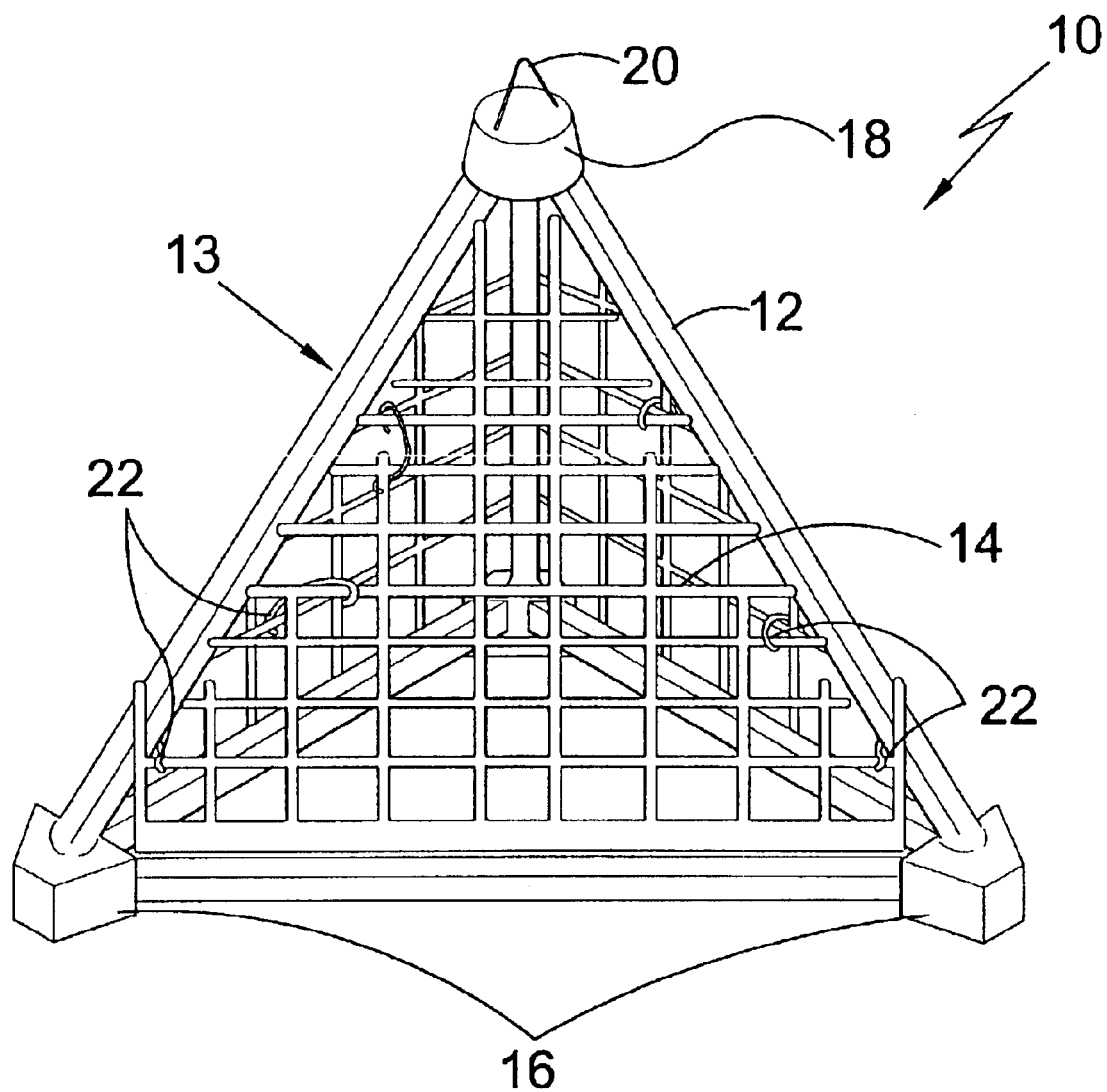
FIG. 4 is a perspective view of the artificial barrier reef of the present invention having the side panels attached to the skeletal framework.

FIG. 4 is a perspective view of the artificial barrier reef of the present invention having the side panels attached to the skeletal framework. The artificial barrier reef 10 includes a plurality of support beams 12 connected to one another so as to form a skeletal frame 13. The skeletal frame 13 preferably is in the shape of an equilateral tetrahedron. Preferably, the support beams 12 are formed from concrete in order to provide rigid support for the skeletal frame 13 while not adversely interfering with the aquatic environment in which the artificial barrier reef 10 is placed. The use of concrete is described only for purposes of example and any material which provides rigid support and would not adversely interfere with an aquatic environment could be used.

The skeletal frame 13 is formed from six support beams 12. The skeletal frame 13 is formed by three support beams 12 arranged in the shape of a triangle. The three support beams 12 which form the base are connected at each vertex by a weighted connector 16. Preferably, the weighted connectors 16 are each also formed from concrete, however any material that would provide additional weight and aid in preventing unwanted drift of the artificial barrier reef 10 may be used. The remaining three support beams 12 not used to form the triangular base are connected to extend angularly from the weighted connectors 16 at each vertex of the triangular base to form a pyramid. The angularly extending support beams 12 are secured together by a cap 18 at an apex of the pyramid where the angularly extending support beams 12 meet. The cap 18 connecting the support beams 12 is preferably weighted and formed from concrete as well in order to prevent unwanted drift of the artificial barrier reef 10 after placement in a body of water. Positioned on the cap 18 is a loop 20 for use in selectively moving and positioning of the artificial barrier reef 10 of the present invention. Preferably, a mechanical lifting device such as a crane is connected to the loop 20 of the artificial barrier reef 10 to aide in lifting and positioning of the artificial barrier reef 10 both on land and in the water. However, any device able to lift and move the artificial barrier reef 10 of the present invention may be used to selectively position the artificial barrier reef 10 both on land and in water.

The artificial barrier reef 10 of the present invention further includes a plurality of side panels 14 for positioning against the sides of the pyramid of the skeletal frame 13. Preferably, three side panels 14 used to form the artificial barrier reef 10 of the present invention. However, a fourth side panel 14 may also be used by positioning the fourth side panel 14 on the remaining open end of the equilateral tetrahedron. It is preferable that the side panels 14 are formed from metal which would provide support to the artificial barrier reef 10 without adversely affecting the aquatic environment surrounding the reef 10 and which would allow plant life and crustaceans to attach thereby forming an ecosystem where the artificial barrier reef 10 is positioned on the floor of the body of water. The side panels 14 are also formed as a grid. The space between the gridlines is at a predetermined distance preferably between the range of 0.5 and 25 inches. Preferably, the distance between the gridlines is 1.5 inches. The grid of the side panels 14 are formed so as to allow small aquatic life to pass easily therethrough, as well as to allow plant life, crustaceans, and other stationary forms of life to attach thereto. The side panels 14 are triangular in shape and are positioned within and against the skeletal frame 13. Extending up from a base of the triangular side panels 14 at each end thereof is a brake 15. Upon placing the side panels 14 within the skeletal frame 13, the break 15 rests against the support beam 12. The break 15 holds the side panel 14 in place and ensures a secure fit within the skeletal frame 13. Upon placement of the side panels 14, connection hooks 22 are used to connect each side panel 14 to another side panel 14. At least one connection hook 22 must be used to connect the side panels 14 to each other. However, it is preferable to have a plurality of connection hooks 22 used to connect each side panel 14 so as to ensure that the side panels 14 remain in place on the artificial barrier reef 10 of the present invention. The connection hooks 22 have a first end and a second end. Both the first end and the second end each form a hook. The hook of the first end connects to a respective gridline of one side panel 14. The hook of the second end connects to the corresponding gridline on an adjacent side panel 14. Upon connection of a plurality of connection hooks 22, the side panels 14 are secured within the skeletal frame 13.

Figure 5:
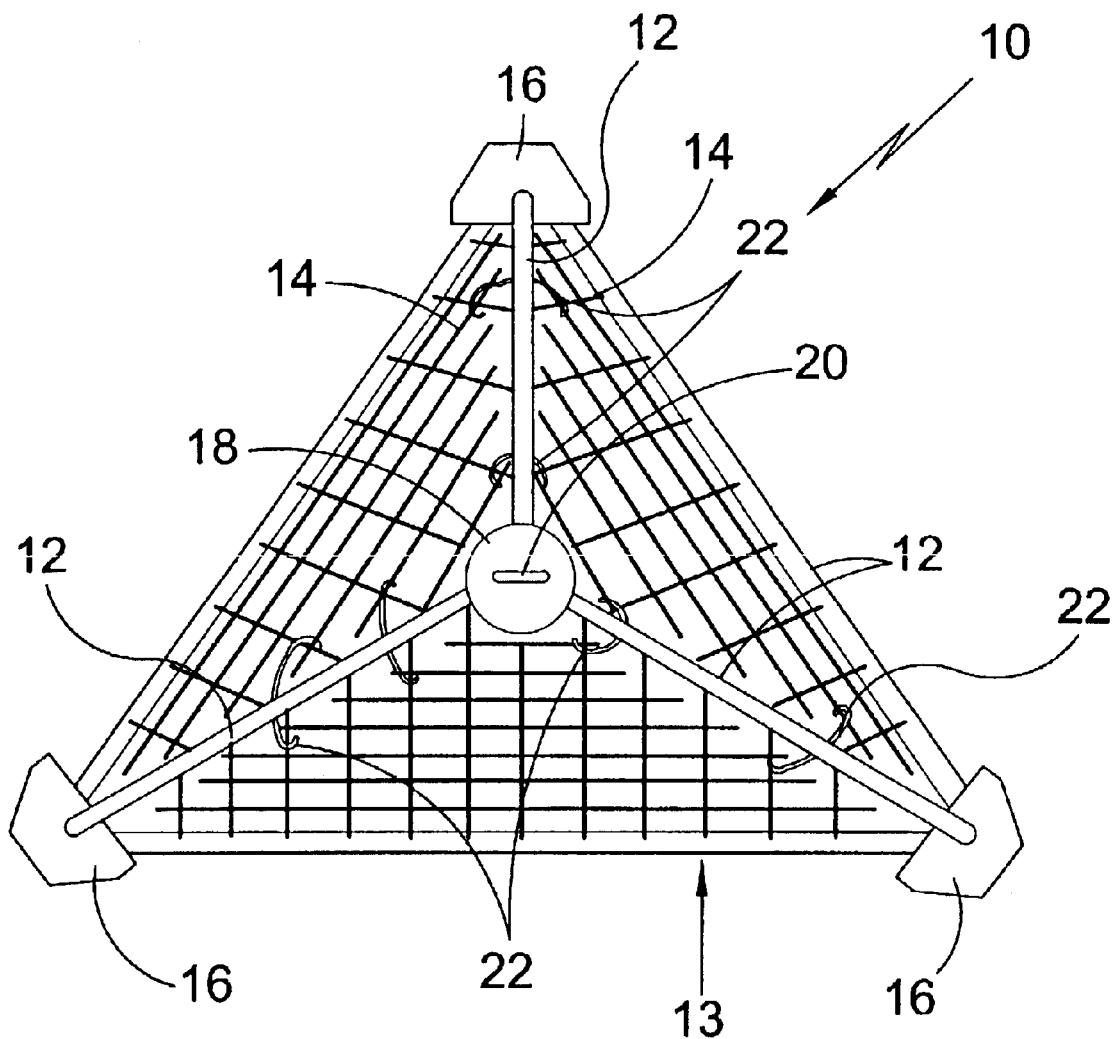
FIG. 5 is a top view of the artificial barrier reef of the present invention.

FIG. 5 is a top view of the artificial barrier reef of the present invention. The artificial barrier reef 10 includes a plurality of support beams 12 connected to one another so as to form a skeletal frame 13. The skeletal frame 13 preferably is in the shape of an equilateral tetrahedron. Preferably, the support beams 12 are formed from concrete in order to provide rigid support for the skeletal frame 13 while not adversely interfering with the aquatic environment in which the artificial barrier reef 10 is placed. The use of concrete is described only for purposes of example and any material which provides rigid support and would not adversely interfere with an aquatic environment could be used.

The skeletal frame 13 is formed from six support beams 12. The skeletal frame 13 is formed by three support beams 12 arranged in the shape of a triangle. The three support beams 12 which form the base are connected at each vertex by a weighted connector 16. Preferably, the weighted connectors 16 are each also formed from concrete, however any material that would provide additional weight and aid in preventing unwanted drift of the artificial barrier reef 10 may be used. The remaining three support beams 12 not used to form the triangular base are connected to extend angularly from the weighted connectors 16 at each vertex of the triangular base to form a pyramid. The angularly extending support beams 12 are secured together by a cap 18 at an apex of the pyramid where the angularly extending support beams 12 meet. The cap 18 connecting the support beams 12 is preferably weighted and formed from concrete as well in order to prevent unwanted drift of the artificial barrier reef 10 after placement in a body of water. Positioned on the cap 18 is a loop 20 for use in selectively moving and positioning of the artificial barrier reef 10 of the present invention. Preferably, a mechanical lifting device such as a crane is connected to the loop 20 of the artificial barrier reef 10 to aide in lifting and positioning of the artificial barrier reef 10 both on land and in the water. However, any device able to lift and move the artificial barrier reef 10 of the present invention may be used to selectively position the artificial barrier reef 10 both on land and in water.

The artificial barrier reef 10 of the present invention further includes a plurality of side panels 14 for positioning against the sides of the pyramid of the skeletal frame 13. Preferably, three side panels 14 used to form the artificial barrier reef 10 of the present invention. However, a fourth side panel 14 may also be used by positioning the fourth side panel 14 on the remaining open end of the equilateral tetrahedron. It is preferable that the side panels 14 are formed from metal which would provide support to the artificial barrier reef 10 without adversely affecting the aquatic environment surrounding the reef 10 and which would allow plant life and crustaceans to attach thereby forming an ecosystem where the artificial barrier reef 10 is positioned on the floor of the body of water. The side panels 14 are also formed as a grid. The space between the gridlines is at a predetermined distance preferably between the range of 0.5 and 25 inches. Preferably, the distance between the gridlines is 1.5 inches. The grid of the side panels 14 are formed so as to allow small aquatic life to pass easily therethrough, as well as to allow plant life, crustaceans, and other stationary forms of life to attach thereto. The side panels 14 are triangular in shape and are positioned within and against the skeletal frame 13. Extending up from a base of the triangular side panels 14 at each end thereof is a brake 15. Upon placing the side panels 14 within the skeletal frame 13, the break 15 rests against the support beam 12. The break 15 holds the side panel 14 in place and ensures a secure fit within the skeletal frame 13. Upon placement of the side panels 14, connection hooks 22 are used to connect each side panel 14 to another side panel 14. At least one connection hook 22 must be used to connect the side panels 14 to each other. However, it is preferable to have a plurality of connection hooks 22 used to connect each side panel 14 so as to ensure that the side panels 14 remain in place on the artificial barrier reef 10 of the present invention. The connection hooks 22 have a first end and a second end. Both the first end and the second end each form a hook. The hook of the first end connects to a respective gridline of one side panel 14. The hook of the second end connects to the corresponding gridline on an adjacent side panel 14. Upon connection of a plurality of connection hooks 22, the side panels 14 are secured within the skeletal frame.

The top view of the artificial barrier reef of the present invention shows the effectiveness at which the artificial barrier reef 10 can function as an artificial habitat. The pyramid shape of the skeletal frame 13 shows that when positioned on the floor of a body of water, the ease at which an ecosystem can form using the artificial barrier reef 10 as a basis thereof. Additionally, if a plurality of artificial barrier reefs 10 were positioned in close proximity to one another, it is clear that a large aquatic ecosystem could be artificially constructed by having places for small fish and crustaceans to move about as well as having plants and other stationary forms of life develop. The loop 22 at the apex of the pyramid allows for easy positioning in a body of water to allow a user to selectively position the artificial reefs 10 as discussed with specific reference to FIG. 1.

Figure 6:
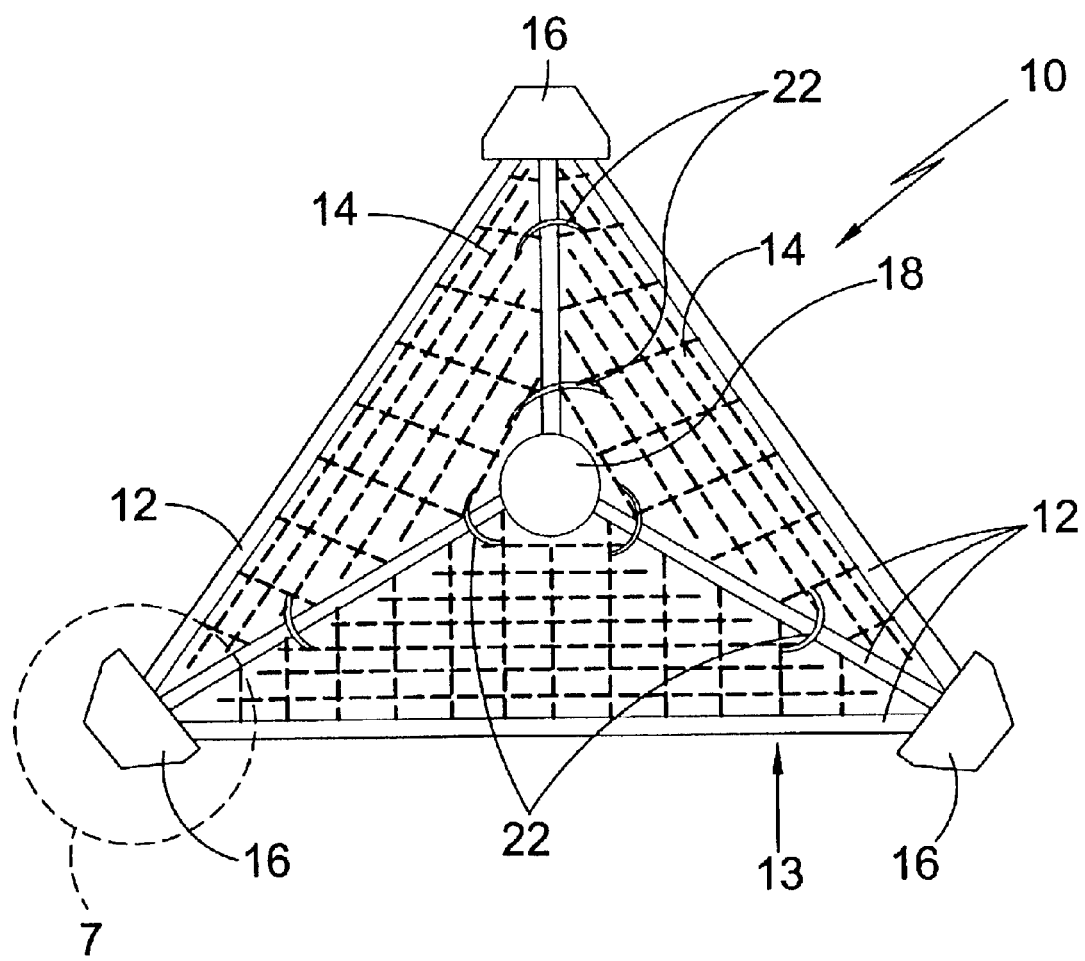
FIG. 6 is a bottom view of the artificial barrier reef of the present invention.

FIG. 6 is a bottom view of the artificial barrier reef of the present invention. The artificial barrier reef 10 includes a plurality of support beams 12 connected to one another so as to form a skeletal frame 13. The skeletal frame 13 preferably is in the shape of an equilateral tetrahedron. Preferably, the support beams 12 are formed from concrete in order to provide rigid support for the skeletal frame 13 while not adversely interfering with the aquatic environment in which the artificial barrier reef 10 is placed. The use of concrete is described only for purposes of example and any material which provides rigid support and would not adversely interfere with an aquatic environment could be used.

The skeletal frame 13 is formed from six support beams 12. The skeletal frame 13 is formed by three support beams 12 arranged in the shape of a triangle. The three support beams 12 which form the base are connected at each vertex by a weighted connector 16. Preferably, the weighted connectors 16 are each also formed from concrete, however any material that would provide additional weight and aid in preventing unwanted drift of the artificial barrier reef 10 may be used. The remaining three support beams 12 not used to form the triangular base are connected to extend angularly from the weighted connectors 16 at each vertex of the triangular base to form a pyramid. The angularly extending support beams 12 are secured together by a cap 18 at an apex of the pyramid where the angularly extending support beams 12 meet. The cap 18 connecting the support beams 12 is preferably weighted and formed from concrete as well in order to prevent unwanted drift of the artificial barrier reef 10 after placement in a body of water. Positioned on the cap 18 is a loop 20 for use in selectively moving and positioning of the artificial barrier reef 10 of the present invention. Preferably, a mechanical lifting device such as a crane is connected to the loop 20 of the artificial barrier reef 10 to aide in lifting and positioning of the artificial barrier reef 10 both on land and in the water. However, any device able to lift and move the artificial barrier reef 10 of the present invention may be used to selectively position the artificial barrier reef 10 both on land and in water.

The artificial barrier reef 10 of the present invention further includes a plurality of side panels 14 for positioning against the sides of the pyramid of the skeletal frame 13. Preferably, three side panels 14 used to form the artificial barrier reef 10 of the present invention. However, a fourth side panel 14 may also be used by positioning the fourth side panel 14 on the remaining open end of the equilateral tetrahedron. It is preferable that the side panels 14 are formed from metal which would provide support to the artificial barrier reef 10 without adversely affecting the aquatic environment surrounding the reef 10 and which would allow plant life and crustaceans to attach thereby forming an ecosystem where the artificial barrier reef 10 is positioned on the floor of the body of water. The side panels 14 are also formed as a grid. The space between the gridlines is at a predetermined distance preferably between the range of 0.5 and 25 inches. Preferably, the distance between the gridlines is 1.5 inches. The grid of the side panels 14 are formed so as to allow small aquatic life to pass easily therethrough, as well as to allow plant life, crustaceans, and other stationary forms of life to attach thereto. The side panels 14 are triangular in shape and are positioned within and against the skeletal frame 13. Extending up from a base of the triangular side panels 14 at each end thereof is a brake 15. Upon placing the side panels 14 within the skeletal frame 13, the break 15 rests against the support beam 12. The break 15 holds the side panel 14 in place and ensures a secure fit within the skeletal frame 13. Upon placement of the side panels 14, connection hooks 22 are used to connect each side panel 14 to another side panel 14. At least one connection hook 22 must be used to connect the side panels 14 to each other. However, it is preferable to have a plurality of connection hooks 22 used to connect each side panel 14 so as to ensure that the side panels 14 remain in place on the artificial barrier reef 10 of the present invention. The connection hooks 22 have a first end and a second end. Both the first end and the second end each form a hook. The hook of the first end connects to a respective gridline of one side panel 14. The hook of the second end connects to the corresponding gridline on an adjacent side panel 14. Upon connection of a plurality of connection hooks 22, the side panels 14 are secured within the skeletal frame.

The view of the artificial barrier reef 10 of the present invention in FIG. 6 shows the underside thereof. It is clearly shown that the side panels 14 are connected to each other by the plurality of connecting hooks in order to keep the side panels 14 in place. The side panels being formed as a grid allow for small aquatic life forms to grow and flourish because the space between each grid line prevents larger life forms from interrupting any development thereof. Additionally, plant life can easily grow up from the floor of the body of water and attach itself to the grid of the side panel 14. The artificial barrier reef 10 provides an artificial building block for an underwater ecosystem that will not adversely interfere with natural aquatic environment surrounding the barrier reef 10 of the present invention.

Figure 7:
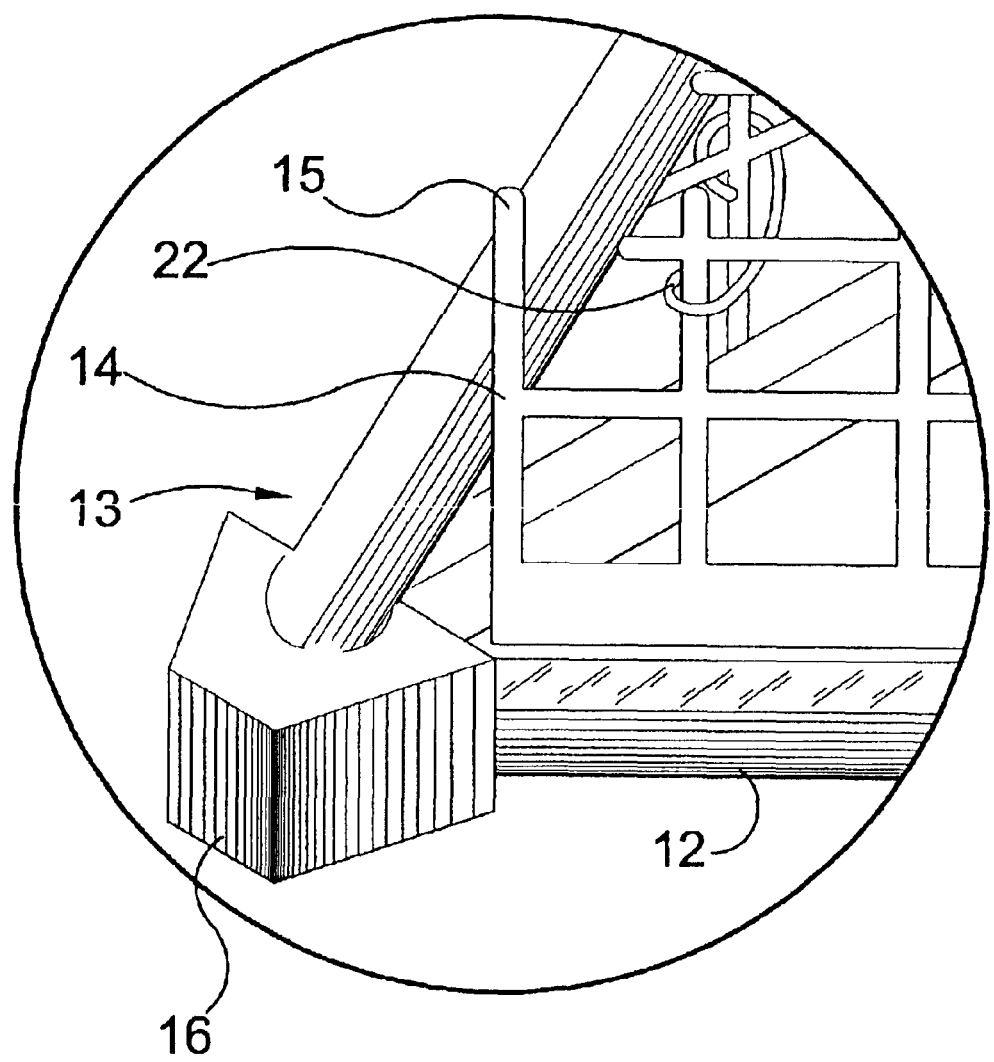
FIG. 7 is a view of a connection point on the skeletal frame taken from within the circle labeled 7 in FIG. 6 of the present invention.

FIG. 7 is a cut away view of a connection point on the skeletal frame taken from within the circle labeled 7 in FIG. 6 of the present invention. Shown is the weighted connector 16 having the support beams 12 connected to and extending therefrom. The side panel 14 is shown resting against the skeletal frame 13. At the base of the side panel the brake 15 extends in a direction towards the apex of the pyramid of the skeletal frame. Upon positioning the side panel 14 against the skeletal frame 13 the brake 15 rests against the support beam 12 thereby holding the side panel 14 in place against the frame 13. Each side panel 14 has two brakes 15 extending upward from each end of the base so that each brake 15 may rest against the corresponding support beam 12. Further shown is the connection hook 22 holding one side panel 14 to a second side panel 14. Preferably there are a plurality of connection, hooks 22 used for connecting one side panel 14 to the second side panel 14.

The artificial barrier reef 10 of the present invention may be constructed in any size. The size of the artificial barrier reef 10 is determined by the length of the support beams 12 used in construction thereof. As the artificial barrier reef 10 is an equilateral tetrahedron, all the support beams 12 must be the same length. Therefore, the side panels 14 can also be formed to fit varying sizes of skeletal frames 13 that may be constructed. Transportation of a plurality of the artificial barrier reefs 10 of the present invention is made easy because each reef 10 can be stacked one on top of another as the triangular base of the skeletal frame remains open. Upon reaching the desired location, the artificial barrier reef can be carefully positioned on the floor of a body of water so as to not disturb the environment which the reef 10 is entering. Once the artificial reef 10 of the present invention is in its desired position, the artificial reef 10 provides habitat for a variety of fish and plant life.

From the above description it can be seen that the artificial barrier reef 10 of the present invention is able to overcome the shortcomings of prior art devices by providing an artificial barrier reef formed from a plurality of concrete beams forming a skeletal frame having a tetrahedral shape. At each junction of the concrete beams, a weighed connector, preferably formed from concrete, is used to connect each beam to the other. A lifting element positioned at the apex of the skeletal framework in order to allow easy transportation and positioning of the artificial barrier reef in its desired position. A plurality of sides, each formed as a grid, is positioned on each side of the skeletal frame thereby allow for the ingress of small aquatic life while functioning as a barrier for larger species and also provides an anchoring base for many stationary life forms such as crustaceans, coral, mollusks and plant life.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is:

1. An artificial barrier reef for positioning on the floor of a body of water for aiding in the development of an underwater ecosystem, said artificial barrier reef comprising;

a) a skeletal frame formed from a plurality of support beams, said frame having a triangular base formed by support beams and a support beam extending from each corner of said triangular base to form a pyramid with open side panels;

b) a plurality of connectors for connecting said support beams together;

c) a cap for connecting said support beams forming said open side panels at an apex of said frame;

d) a grate covering each of said side panels, each grate including a plurality of bars connected in a criss-cross pattern allowing fish of a predetermined size to pass therethrough into and out of said skeletal frame; and e) each grate being triangular in shape hook connectors for connecting adjacent grates, and a brake extending up from a bottom bar for holding said grates in place and ensuring a secure fit within said skeletal frame.

2. The artificial barrier reef as recited in claim 1 further comprising a loop connected to said cap for easy movement and positioning of said artificial barrier reef.

3. The artificial barrier reef as recited in claim 1, wherein each of said plurality of bars are connected at a predetermined distance from adjacent ones of said plurality of bars extending parallel thereto.

4. The artificial barrier reef as recited in claim 3, wherein said predetermined distance between adjacent ones of said plurality of bars is between substantially 0.5 inches and 25 inches.

5. The artificial barrier reef as recited in claim 3, when said predetermined distance between adjacent ones of said plurality of bars is substantially 1.5 inches.

6. The artificial barrier reef as recited in claim 1, wherein said grates are formed of metal.

7. The artificial barrier reef as recited in claim 1, wherein said support beams are each formed of a rigid material of a predetermined weight able to preventing undesired movement of said artificial barrier reef after placement.

8. The artificial barer reef as recited in claim 7, wherein said support beams are formed from concrete and are able to preventing undesired movement of said artificial barrier reef after placement.

9. The artificial barrier reef as recited in claim 1, wherein said support beams have equal dimensions.

10. The artificial barrier reef as recited in claim 1, wherein the dimensions of said support beams used in forming said base are not equal to the dimensions of said support beams used in forming said side panels.

11. The artificial barrier reef as recited in claim 1, wherein said skeletal frame forms an equilateral tetrahedron.

12. The artificial barrier reef as recited in claim 1, wherein said connectors and said cap provide additional weight for preventing undesired movement of said artificial barrier reef after placement.

13. The artificial barrier reef as recited in claim 12, wherein said weighted connectors and said weighted cap are formed from concrete.

14. An artificial barrier reef for positioning on the floor of a body of water for aiding in the development of an underwater ecosystem, said artificial barrier reef comprising:

a) a skeletal frame formed from a plurality of support beams, said frame having a base and a plurality of side panels extending from said base to form a pyramid;

b) a plurality of connectors for connecting said support beams together, c) a cap having a loop for connecting said support beams forming said side panels at an apex of said pyramid;

d) a plurality of grates, each grate having a triangular shape and being formed as a grid, each grate being positioned within said skeletal frame to cover a respective side panel of said pyramid; and e) a plurality of connecting hooks for connecting adjacent grates to each other for securing said grates to said skeletal frame, wherein upon connection of said grates, said artificial barrier reef is selectively moveable via said loop in order to position said artificial barrier reef in a desired location within a body of water.

* * * * *